United States Patent [19]

Weber et al.

[11] 4,450,928
[45] May 29, 1984

[54] DUAL MODE SEISMIC SOURCE VIBRATOR

[75] Inventors: Richard M. Weber, Prosper; John W. Bedenbender, Plano, both of Tex.

[73] Assignee: Texas Instruments Incorporated, Dallas, Tex.

[21] Appl. No.: 289,444

[22] Filed: Aug. 3, 1981

[51] Int. Cl.³ .............................................. G01V 1/133
[52] U.S. Cl. ..................... 181/121; 92/13.1; 181/119
[58] Field of Search ............... 181/113, 114, 119, 121, 181/401; 367/189, 190; 92/13.1, 13.6; 166/334; 73/665

[56] References Cited

U.S. PATENT DOCUMENTS

| | | | |
|---|---|---|---|
| 356,538 | 1/1887 | Hubner | 92/13.1 |
| 2,478,790 | 8/1949 | Stephens | 92/13.1 |
| 2,596,471 | 5/1952 | Densmore et al. | 92/13.1 |
| 3,529,428 | 9/1970 | Batten | 166/334 X |
| 3,926,409 | 12/1975 | Abney et al. | 166/334 X |
| 4,046,623 | 9/1977 | Schmid | 92/13.1 X |
| 4,072,087 | 2/1978 | Mueller | 92/13.1 X |
| 4,106,586 | 8/1978 | Stafford | 181/121 |
| 4,147,228 | 4/1979 | Bouyoucos | 181/119 |
| 4,253,538 | 3/1981 | Weber et al. | 181/119 |

*Primary Examiner*—Maynard R. Wilbur
*Assistant Examiner*—K. R. Kaiser
*Attorney, Agent, or Firm*—Thomas G. Devine; Leo N. Heiting; Melvin Sharp

[57] ABSTRACT

A dual mode vibrator (DMV), in its hydraulic cylinder, automatically provides a shorter stroke for higher frequencies and a longer stroke for lower frequencies. The cylinder contains a pair of sleeves, each sleeve having one diameter portion sufficient to slideably engage the piston and having a smaller diameter portion to slideably engage the piston rod. The sleeves themselves are moveable within the cylinder, such movement being effected by the application of high pressure on one end or the other. When the sleeves are moved together, the stroke is effectively shortened. When the sleeves are moved apart, the stroke is effectively lengthened.

10 Claims, 3 Drawing Figures

DUAL MODE SEISMIC SOURCE VIBRATOR

BACKGROUND OF THE INVENTION

1. Field of the Invention

This invention relates to seismic source hydrualic vibrators and more particularly to dual mode seismic hydraulic vibrators wherein a short or long stroke is automatically selected.

2. Description of the Prior Art

In the prior art, vibrators were designed to be either a low or high frequency unit.

A low frequency vibrator is typified by its large peak to peak stroke. This large stroke results in a large compressible oil volume within the system. This large volume of oil significantly degrades the high frequency performance.

A high frequency vibrator is typified by its short peak to peak stroke, the short stroke limiting the lowest frequency at which it can develop its full force capability.

In more recent times, a dual mode vibrator having a manually selectable mode for high and low frequency has been disclosed. Internally movable sleeves having a single inside diameter, and slideable on the piston rod, are implemented in this design. The sleeves are moved by setting a hand valve.

The particular configuration of the present invention wherein the moveable sleeve encompasses the piston at one end and the rod at the other readily enables the implementation of an anti-rotation device that reduces the effective oil volume from that of the prior art. Coupled with an automatic lengthening or shortening of the stroke, the combination of this invention provides a dual mode vibrator without the disadvantages of the prior art single mode vibrators or of the prior art dual mode vibrator.

BRIEF SUMMARY OF THE INVENTION

The present invention relates to an improved hydraulic vibrator having a piston to which is connected a pair of oppositely extending rods and a reaction mass reciprocally encompassing the piston and piston rods forming an hydraulic cylinder therein so that when hydraulic fluid is forced against one side or the other of the piston, the piston moves relative to the cylinder, causing the reaction mass to reciprocate. A pair of sleeves is positioned within the cylinder, each sleeve slideably engaging one piston rod and also slideably engaging the piston, having a smaller diameter for that portion engaging the rod and a larger diameter for that portion engaging the piston. A low frequency port is provided at the piston end of each sleeve for receiving high pressure oil to move the sleeve toward the rod end, thereby increasing the effective stroke. A high frequency port is provided at the rod end for introducing high pressure to move the sleeve toward the piston end, thereby reducing the length of the stroke.

A variable frequency generator provides frequencies to the vibrator which the vibrator is designed to follow. The frequency generator provides an input to a comparator circuit whose other input is a representation of a particular frequency above which it has been determined that the stroke of the vibrator should be shortened. The output of the comparator goes to a four way hydraulic valve which is connected to the high pressure source of hydraulic fluid and also to a low pressure source of hydraulic fluid. If the comparator output indicates a comparison, then the four way hydraulic valve is switched so that either the low frequency port is connected to the source of high pressure and the high frequency port is connected to the source of low pressure or vice versa, depending upon which way the sleeve is to be moved.

Each sleeve is prevented from substantially rotating by a pin assembly that is inserted through the cylinder and engages a slot in the periphery of the sleeve. In the prior art, oil receiving inlets are slots formed around the entire periphery of the cylinder to allow full rotation. In the present invention, rotation is prevented and the oil inlet slots are localized at the inlet port rather than being circumferential. This reduces the oil volume substantially and enables much better operation at high frequency.

An general object of the present invention is to provide an improved hydraulic vibrator.

A further object of the invention is the provision of an improved hydraulic vibrator capable of producing vibrations over a broad frequency range.

Another object of the invention is to provide a seismic vibrator of the type having a piston wih piston rods extending from opposite faces of the piston wherein the stroke of the piston is automatically controlled to be long or short, depending upon the frequency output.

Still another object of the invention is to provide a seismic vibrator of the dual mode type having a pair of internal sleeves that each accommodate the piston at one end and the piston rod at the other, automatically slideable to change the length of the piston stroke, and to prevent the sleeves from rotating to eliminate circumferential input fluid ports.

These and other objects will be made evident in the detailed description that follows.

DETAILED DESCRIPTION OF THE INVENTION

In accordance with this invention, the piston stroke of a seismic source vibrator is automatically controlled through a pair of internal sleeves that are automatically moved to effectively shorten the stroke above a predetermined frequency and to automatically lengthen the stroke below that predetermined frequency. In addition, the total oil volume is kept to a minimum through the use of an anti-rotation device to minimize the volume required for input fluid ports.

Figure 1:
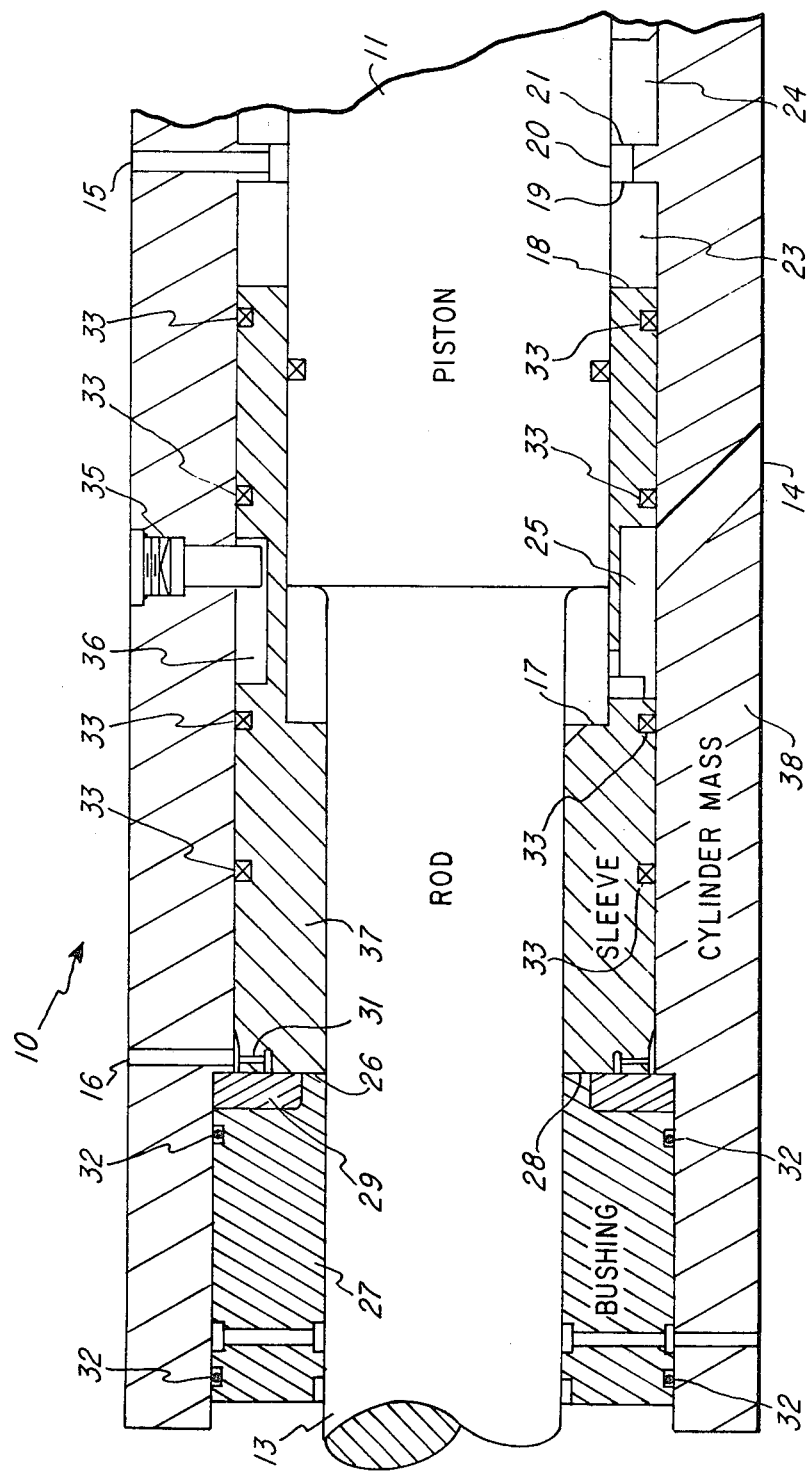
FIG. 1 is a cross section of a seismic vibrator employing the movable sleeve and anti-rotation device of this invention.

FIG. 1 illustrates the seismic source vibrator 10 in cross section having a piston 11 to which is connected piston rod 13. FIG. 1 illustrates the left half of the total vibrator cross section. The right half is identical and it need not be shown. Also, a base plate (not shown) is connected to piston rod 13. Movable sleeve 37 is shown positioned within the cylinder mass 38. Ring seals 33 are shown to provide a seal between the sleeve 37 and cylinder mass 38. O ring type seals 32 provide a seal between bushing 27 and cylinder mass 38. Bushing 27, in this preferred embodiment, is made of bronze and has a hard steel insert 29 against which the face 26 of sleeve 37 bears (when sleeve 37 is moved to the left). Port 14 provides a path for hydraulic fluid from the servo valve of the system (not shown) into volume 25 to exert force against piston 11.

Port 15 is selectively connected to the source of high and low pressure. As shown in FIG. 1, high pressure has been transmitted through port 15 into volumes 23 and 24 to force sleeve 37 to move to the left and the right hand sleeve (not shown) to move to the right. Port 16 is also selectively connected to the source of low pressure hydraulic fluid or the source of high pressure hydraulic fluid. As shown in FIG. 1, low pressure fluid is present in port 16.

Figure 2:
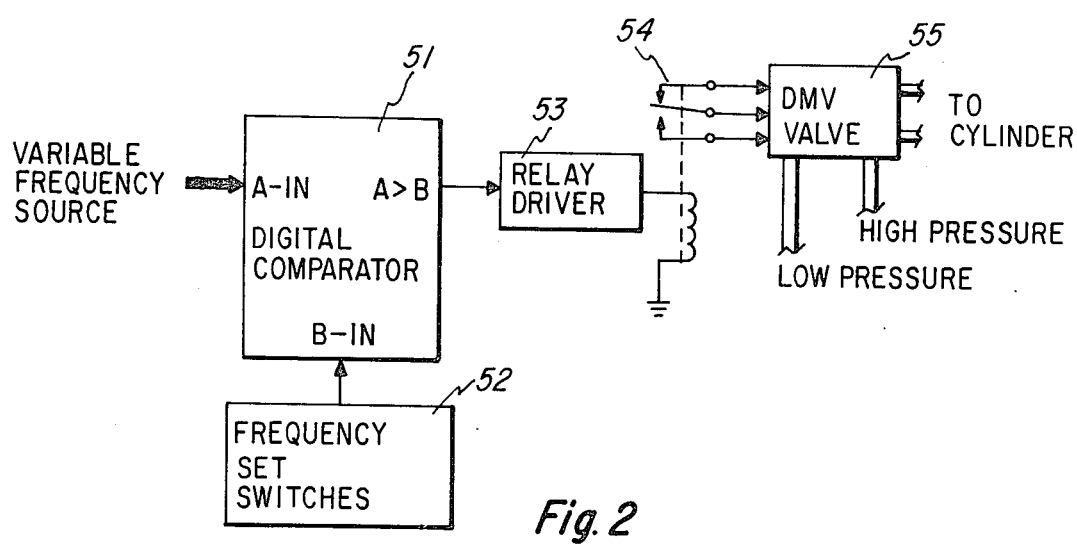
FIG. 2 is a block diagram of the automatic control for lengthening and shortening the stroke.

FIG. 2 shows a variable frequency source to the A input of digital comparator 51. The variable frequency source is well known in the prior art and is fully described in U.S. Pat. No. 4,056,163 "Tracking Band Pass Filter for Conditioning Vibrator Accelerometer WaveForm",issued Nov. 1,1977 to the assignee of this invention. Digital comparator 51 is made up of four type SN74LS85 "Four-Bit Magnitude Comparators" manufactured by Texas Instruments Incorporated. The B input to digital comparator 51 is supplied by frequency set switches 52 which are set to the predetermined frequency. The output from digital comparator 51 provides an input to relay driver 53 which activates relay 54. The outputs from relay 54 provide electrical selection inputs to DMV valve 55. DMV valve 55 is connected to the source of low pressure hydraulic fluid and to the source of high pressure hydraulic fluid. Two hydraulic connections are made of ports 15 and 16 of the vibrator 10. The DMV valve, in this preferred embodiment, is manufactured by the Double A Company, Part No. QG-06H-C-Y-T-10A2-12VDC. The components indentified herein are strictly a matter of engineering choice and obviously are not limiting to the scope of this invention.

Figure 3:
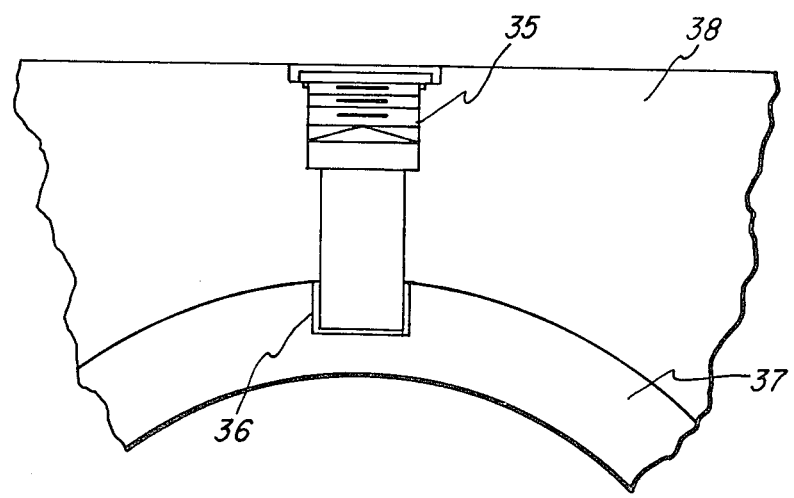
FIG. 3 is a cross section illustrating the anti-rotation device of this invention.

FIG. 3 illustrates the anti-rotation device of this invention. Pin 35, secured in cylinder mass 38, engages slot 36 in sleeve 37. This engagement prevents rotation of sleeve 37 except to the amount of the clearance between Pin 35 and slot 36.

In the prior art, hydraulic input port 25 was a circumferential volume, permitting rotation of internal parts. The prior art configuration increased the amount of hydraulic fluid in the system, thus degrading the high frequency performance. This anti-rotation device of FIG. 3 permits a non-circumferential port 25 and significantly reduces the amount of oil in the system.

The reduction in oil volume is made to increase the stiffness of the spring-like action of the compressible oil. Increasing the spring rate of the oil volume decreases the phase shift through the system. Also, any oil flow required to accommodate the compressibility of the oil volume is real flow which must be supplied. Flow through the servo valve causes the pressure drop across the servo valve ports. Additional oil flow above that required to do useful work degrades the potential performance of the vibrator by detracting from the pressure available to be developed across the piston faces. Therefore, the anti-rotation device is illustrated as being a significant factor in oil reduction.

Equation 1 shows the basic relationships involved in compressible flow:

$$QC = \frac{V}{Be} \frac{dP}{dt} \quad (1)$$

QC=Compressible flow rate
V=Oil volume
Be=Oil effective bulk modulus
dP/dt=Time rate of change of pressure
P=Pressure If the oil pressure was of the form $$P= \sin 2\pi ft$$

then:

$$QC = \frac{2\pi f V}{Be} \cos 2\pi ft \quad (2)$$

The pressure/time function in a vibrator is not sinusoidal but is periodic with some resemblence to a sinusoid.

The dependance of QC on V becomes emphasized at higher frequencies due to the f term in Equation No. 2. It is because of this relationship that V must be reduced at high values of f to reduce the compressible flow.

MODE OF OPERATION

Oil from the working pressure source, at a desired peak pressure, and at a frequency dependent upon the frequency output of the variable frequency source is applied against the left hand face of piston 11, moving piston 11 to the right. Then the working pressure is applied to the right hand face (not shown) of piston 11 moving the piston to the left. Assume that the predetermined frequency is 40 Hertz. Then those frequencies up to 40 Hertz utilize a longer stroke for piston 11 than those frequencies above 40 Hertz. In the preferred embodiment of this invention, variable frequency source provides a sweep frequency output. With, for example, a frequency of 25 Hertz, the output of digital comparator 51 would be low and relay driver 53 would not be activated. In that case, high pressure would be conducted through the DMV valve 55 to low frequency port 15. At the same time, low pressure would be supplied through DMV valve 55 to high frequency port 16. Under these conditions, sleeve 37 is moved to the left as illustrated in FIG. 1. Steel insert 29 of bushing 27 provides a hard surface against which face 26 of sleeve 37 may impact. Port 31 is shown to facilitate the initial production of oil to the bushing surface.

Assume now that the frequency rises to 41 Hertz. Then the output from digital comparator 51 will be high, activating relay driver 53 which in turn activates relay 54 causing a switch in the DMV valve 55. Under these circumstances, the source of high pressure will be conducted through port 16 and the source of low pressure will be conducted through port 15. Under these circumstances, the sleeve 37 is moved to the right while the end 18 of sleeve 37 impacts shoulder 19. Note that pin 35 does not contact the left end of slot 36. At the same time, the right hand sleeve (not shown) is moved to the left, impacting shoulder 21. Under these conditions, the stroke is shortened to accommodate the higher frequencies.

With the preferred embodiment here shown, piston 11 contacts surface 17 of sleeve 37 to define the range of travel. It should be here noted that the overtravel cushioning apparatus described in copending application Ser. No. 279657 entitled "Overtravel Cushioning for a Piston Driven Actuator" filed on June 29, 1981, assigned to the Assignee of this invention may also be employed.

In the preferred embodiment, 3000 PSI is the high pressure available, 150 PSI is the low pressure available and the working pressure is a variable between those two limits, all of which are engineering choices and are not intended as limitations. Also, the particular mechanical and electrical configuration may be easily altered by those skilled in the art and is intended only as illustrative. The invention is limited only by the appended claims.

We claim:

1. A dual mode seismic source vibrator actuated by a hydraulic supply source providing working and high pressures, operated at varying frequencies supplied by a variable frequency generator and having a piston and piston rods attached to and extending therefrom within a reciprocally disposed reaction mass forming an hydraulic drive cylinder, comprising:
   (a) working pressure port means, for introducing hydraulic fluid from the working pressure source at a frequency determined by the variable frequency generator, alternately against each face of the piston to cause the piston to reciprocate;
   (b) stroke adjusting means, positioned within the cylinder, surrounding the piston and piston rods, adapted to slideably engage the piston rods within the outer portions of its length and to slideably engage the piston within the central portion of its length, the stroke adjusting means being adapted to slide within the cylinder to effectively shorten or lengthen the central portion thereby shortening or lengthening the piston stroke;
   (c) low frequency port means, positioned to move the stroke adjusting means to lengthen the stroke when the high pressure is present;
   (d) high frequency port means positioned to move the stroke adjusting means to shorten the stroke when the high pressure is present; and
   (e) valve control means electrically connected to the variable frequency generator and hydraulically selectively connected to the low or high frequency port means, and to the hydraulic supply source of high pressure, reactive to the variable frequency generator to apply the high pressure through the low frequency port means when the variable frequency generator frequency is below a predetermined frequency, and vice versa when the variable frequency generator frequency is above the predetermined frequency, thereby moving the stroke adjusting means to lengthen and to shorten the piston stroke, respectively.

2. The vibrator of claim 1 wherein the stroke adjusting means comprises a pair of sleeves, each sleeve having a central portion inner diameter sufficient to slideably engage the reciprocating piston, and having outer portions inner diameters sufficient to slideably engage the piston rods.

3. The vibrator of claim 2 further comprising bushing means positioned within each end of the cylinder, slideably engaging the piston rods, and providing a stop for the stroke adjusting means when the stroke is lengthened.

4. The vibrator of claim 3 further comprising a pair of internal shoulders attached to the cylinder within the central portion, each shoulder providing a stop for the stroke adjusting means when the stroke is shortened.

5. The vibrator of claim 1 wherein the valve control means comprises:
   (e) (i) settable switch means for setting the predetermined frequency;
   (ii) comparison circuit means connected to receive the output from the variable frequency generator and from the settable switch means and to indicate a comparison; and
   (iii) valve means connected to receive the output of the comparison means to switch hydraulic states when a comparison is indicated.

6. The vibrator of claim 4 wherein the valve control means comprises:
   (e) (i) settable switch means for setting the predetermined frequency;
   (ii) comparison circuit means connected to receive the output from the variable frequency generator and from the settable switch means to indicate a comparison; and
   (iii) valve means connected to receive the output of the comparison means and to switch hydraulic means when a comparison is indicated.

7. The vibrator of claim 1 further comprising means for limiting rotation of the stroke adjusting means.

8. The vibrator of claim 4 further comprising means for limiting rotation of the stroke adjusting means.

9. The vibrator of claim 6 further comprising means for limiting rotation of the stroke adjusting means.

10. The vibrator of claims 7, 8, or 9 wherein at least one aperture is provided in the periphery of the stroke adjusting means and further comprising at least one pin attached to the cylinder and positioned to engage the aperture to limit rotation of the stroke adjusting means.

* * * * *